United States Patent [19]
Inoue et al.

[11] Patent Number: 5,434,673
[45] Date of Patent: Jul. 18, 1995

[54] DIGITAL INFORMATION TRANSFERRING APPARATUS CAPABLE OF IDENTIFYING THE TYPE OF DEVICE SUPPLIED WITH THE TRANSFERRED INFORMATION

[75] Inventors: Hajime Inoue, Chiba; Takahito Seki; Keiji Kanota, both of Kanagawa, all of Japan

[73] Assignee: Sony Corporation, Tokyo, Japan

[21] Appl. No.: 5,048

[22] Filed: Jan. 15, 1993

[30] Foreign Application Priority Data

Jan. 29, 1992 [JP] Japan .................. 4-038572

[51] Int. Cl.$^6$ ............................................. H04N 5/76
[52] U.S. Cl. ..................................... 358/335; 360/32
[58] Field of Search ............... 358/335, 342, 310, 135, 358/136, 133, 141; 360/33.1, 35.1, 32; 348/384, 409, 608

[56] References Cited

U.S. PATENT DOCUMENTS

| | | | |
|---|---|---|---|
| 5,057,949 | 10/1991 | Suga et al. | 360/70 |
| 5,068,744 | 11/1991 | Ito | 358/310 |
| 5,070,503 | 12/1991 | Shikakura | |
| 5,140,437 | 8/1992 | Yonemitsu et al. | 358/342 |
| 5,198,900 | 3/1993 | Tsukagoshi | 358/136 |

FOREIGN PATENT DOCUMENTS

0453229 10/1991 European Pat. Off.
0487092 5/1992 European Pat. Off.

OTHER PUBLICATIONS

International Conference on Communications ICC '91 vol. ⅓, 23 Jun. 1991, Denver, Co., USA pp. 491–495 XP269447 R. Kishimoto et al. 'HDTV Transmission System Design in an SDH-based STM Network' paragraph 4.2; FIGS. 5,7.
Communications of the ACM vol. 34, No. 4, 1 Apr. 1991, New York, USA pp. 103–112 XP 228793 M. Liebhold et al. 'Toward an Open Environment for Digital Video' p. 106, column 3, line 35–p. 107, column 1, line 42.
IEEE Transactions on Consumer Electronics vol. 37, No. 3, 1 Aug. 1991, New York, USA pp. 275–282 XP263196 M. Yoneda et al. 'An Experimental Digital VCR with New DCT-based Bit-Rate Reduction System'.
Patent Abstracts of Japan vol. 12, No. 456 (P-793) 30 Nov. 1988 & JP-A-63 177 373 (Toshiba Corp.) 21 Jul. 1988.
Patent Abstracts of Japan, vol. 16, No. 424 (P-1415) 7 Sep. 1992 & JP-A-04 143 969 (Mitsubishi Electric Corp) 18 May 1992.
Patent Abstracts of Japan vol. 15, No. 63 (P-1166) 14 Feb. 1991 & JP-A-02 287 981 (Matsushita Electric Ind. Co. Ltd.) 28 Nov. 1990.
Patent Abstracts of Japan vol. 14, No. 341 (P-1081) 24 Jul. 1990 & JP-A-02 118 941 (Sony Corp.) 7 May 1990.

*Primary Examiner*—Tommy P. Chin
*Assistant Examiner*—Robert Chevalier
*Attorney, Agent, or Firm*—William S. Frommer; Alvin Sinderbrand

[57] ABSTRACT

In a digital information signal transferring apparatus for transferring sequential sync block data composed of encoded synchronous, ID and digital information signals, the digital information signal is encoded and an insertion area is formed therein, whereupon, an ID signal is added in the insertion area and comprises a format identifying signal, a signal for identifying the type of the digital information signal, and a sync block number.

17 Claims, 4 Drawing Sheets

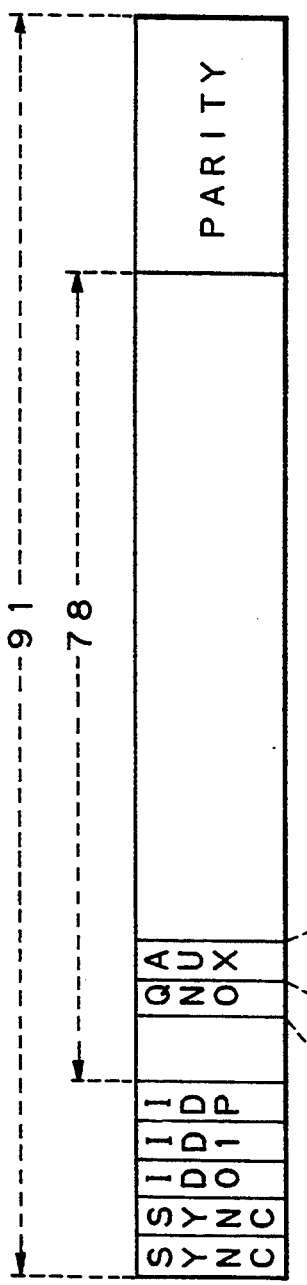

DIGITAL INFORMATION TRANSFERRING APPARATUS CAPABLE OF IDENTIFYING THE TYPE OF DEVICE SUPPLIED WITH THE TRANSFERRED INFORMATION

BACKGROUND OF THE INVENTION

1. Field of the Invention

The present invention relates to a digital information transferring apparatus for a Discrete Cosine Transform (DCT) compressed digital image signal, a PCM audio signal, and a control subcode, and, in particular, relates to an ID signal added to each sync block of the transferred data.

Digital VTRs are known which use, for example, rotating heads for recording digital video signals on a magnetic tape. Since digital video signals comprise a very large amount of information, digital VTRs have often employed highly efficient coding techniques for compressing the amount of recorded or transmitted data. Among these techniques, Discrete Cosine Transform (DCT) coding has been practically employed. In these digital VTRs, in addition to the DCT encoded digital video signal, a PCM audio signal and control subcode are also recorded on a magnetic tape by means of rotating heads.

In the DCT coding, one frame of image information is transformed into blocks composed of, for example, (8×8) picture elements or pixels, and then these blocks are processed by a cosine transform which is a kind of orthogonal transform. Thus, (8×8) coefficient data are generated. These coefficient data are processed with a variable length code such as, a run length code or Huffman code. Before being transferred to a receiving system, the encoded data, an ID signal, and so forth are transformed into frames so that the reproducing system can easily process the received data. Each frame may be composed of sync blocks in which a block synchronous signal is added to data at predetermined intervals. The reproducing system can then transform the frames into the desired reproduced data.

The ID signal contains a sync block number (address) and so forth. By using a cassette tape and a tape head mechanism in a digital VTR, the ID signal can be applied to an external memory (a data streamer) for use in computers. However, with the conventional ID signal, such external application has not been contemplated. In digital VTRs, the insertion of an ID signal for identifying the record mode, broadcasting system format, and so forth has been considered. However, when the digital VTR is used as an external memory for computers, an ID signal for each record mode and each broadcasting format is not necessary. Therefore, the amount of information conventionally included in the ID signal would be unnecessary and the effective data area would be undesirably reduced.

OBJECTS AND SUMMARY OF THE INVENTION

Therefore, an object of the present invention is to provide a digital information signal transferring apparatus which is not only suitable for digital VTRs, but may also be extended to other applications or apparatuses.

According to an aspect of the present invention, there is provided a digital information signal transferring apparatus for transferring sequential sync block data composed of encoded synchronous, ID, and digital information signals, comprising: encoding means for encoding the digital information signal; insertion area forming means for forming an insertion area for the synchronous and ID signals in output data of the encoding means; and ID adding means for adding an ID signal in the insertion area, such ID signal comprising a format identifying signal, a signal for identifying the type of the digital information signal, and a sync block number.

The format identifying signal included in the ID signal allows a digital VTR record format or the record format for another apparatus, such as, a data streamer, to be identified. A reproducing system or circuit can then correctly process reproduced data on the basis of the format identifying signal. Thus, the format identifying signal can be easily employed for adapting the digital information signal transferring apparatus for use with other external apparatuses. In addition, since the type of record information has been inserted, only the insertion of an ID signal into the AUX area in accordance with the type of record information is required. As a result, the amount of data in the ID signal need not be increased.

The above, and other, objects, features and advantages of the present invention will become readily apparent from the following detailed description thereof which is to be read in connection with the accompanying drawings.

BRIEF DESCRIPTION OF THE DRAWINGS

FIGS. 5 and 5A are schematic diagrams showing another example of a format for a sync block of transfer data.

DETAILED DESCRIPTION OF THE PREFERRED EMBODIMENTS

Figure 1:
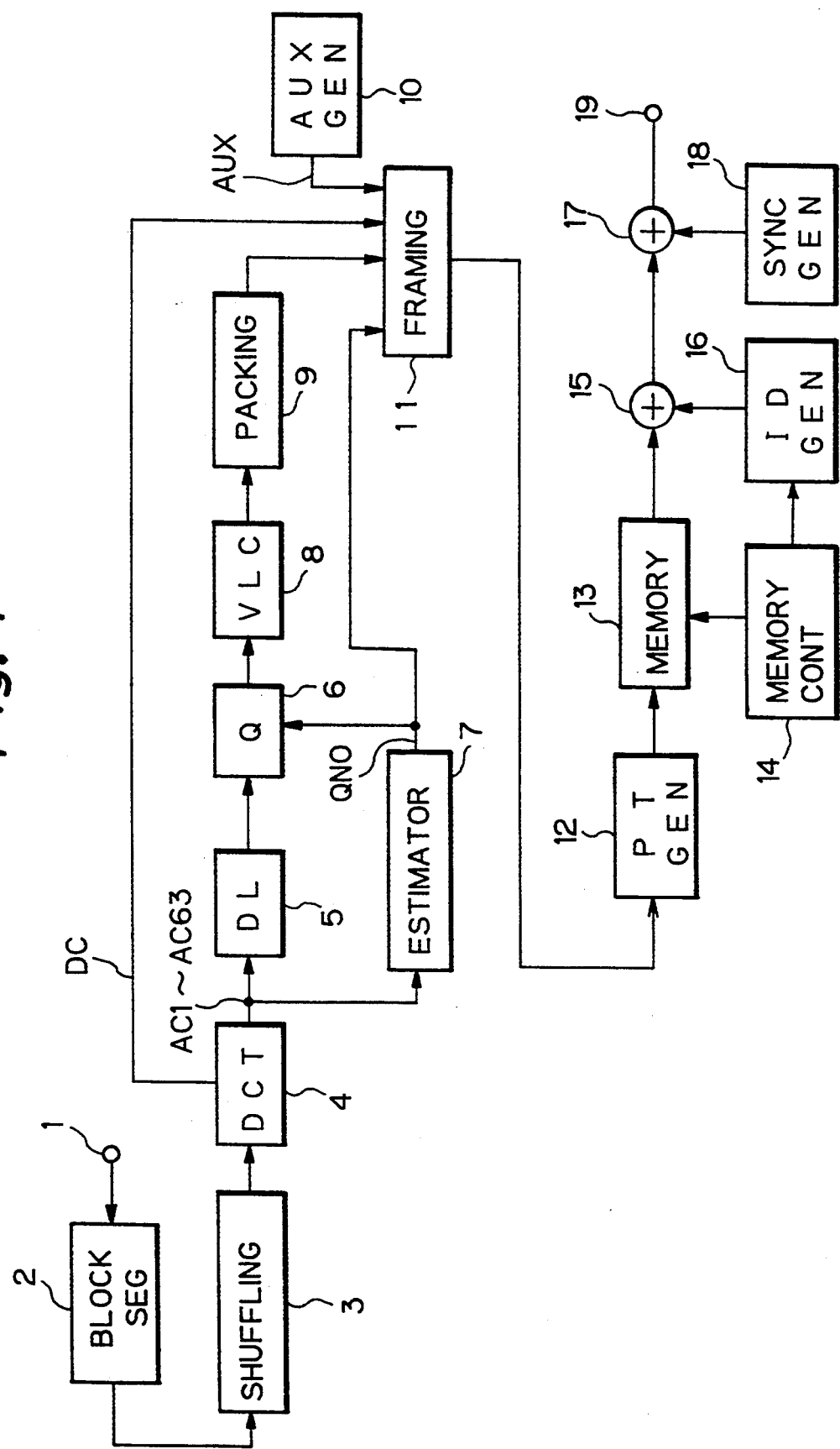
FIG. 1 is a block diagram showing a record data processing circuit of a digital VTR in accordance with an embodiment of the present invention.

An embodiment of the present invention will now be described with reference to FIG. 1 of the accompanying drawings which shows a block diagram of a video data processing circuit included in a recording system of a digital VTR. In FIG. 1, digitized video data is supplied through an input terminal 1 to a block segmentation circuit 2. The block segmentation circuit 2 transforms the video data which is supplied in a raster scanning sequence into data of two-dimensional blocks, each of which is composed of, for example, an 8×8 array of coefficient data representing frequency components of respective picture elements.

The output of the block segmentation circuit 2 is supplied to a shuffling circuit 3 in which the received data are shuffled so as to prevent degradation of the image quality due to uneven distribution of errors. For example, in the shuffling circuit 3, groups of macro blocks of data are placed in different physical positions. The output of the shuffling circuit 3 is supplied to a DCT (discrete cosine transform) circuit 4.

A macro block is composed of a plurality of blocks, each of which is composed of an (8×8) array of coefficient data. For example, in the case of component system video data Y:U:V=4:1:1), four Y blocks in the same position of one frame, one U block, and one V block compose one macro block. When the sampling frequency is 4 fsc (where fsc is a color subcarrier frequency), the image of one frame is composed of (910 samples×525 lines), of which (720 samples×480 lines) are used as the effective data. Thus, in the above-mentioned component system, the total number of blocks comprising one frame is (720×6/4)×480/(8×8)=8100. Therefore, the number of macro blocks in one frame is (8100÷6=1350).

A DC component DC of the (8×8) coefficient data generated by the DCT circuit 4 is supplied to a framing circuit 11. The remaining sixty-three components, which are AC components AC1 to AC63, are supplied from DCT circuit 4 to a quantizing circuit 6 through a delay circuit 5. The AC component coefficient data are transferred to quantizing circuit 6 in low-to-high order zigzag sequence. The coefficient data are also supplied to an estimator 7. The delay circuit 5 provides a delay time corresponding to the time period required by the estimator 7 for determining an adequate quantizing number QNO.

The quantizing circuit 5 requantizes the AC components AC1 to AC63. In other words, the quantizing circuit 6 divides the AC coefficient data by an adequate quantizing step and obtains quotients in integers. The quantizing step is determined by a quantizing number QNO received from the estimator 7. In the digital VTR, since processes such as editing are performed on a field-by-field or frame-by-frame basis, the amount of data per field or frame should be no greater than a target value. Since the amount of data which is generated in the DCT process and that in the variable length encoding process vary depending on the pictorial pattern to be encoded, a buffering process is performed for limiting the amount of data which is generated to no more than a target value so that a buffering unit which is shorter than the interval of one field or one frame can be employed. The reason the buffering unit is decreased is to simplify the buffering circuit, such as, by decreasing the memory capacity necessary for buffering. In this example, the buffering unit is 15 macro blocks, but as few as 5 macro blocks can be employed. In other words, the buffering unit is composed of an integral number of macro blocks.

The output of the quantizing circuit 6 is supplied to a variable length code encoding circuit 8. The variable length code encoding circuit 8 performs run length encoding, Huffman encoding, and the like. For example, circuit 8 may perform a two-dimensional Huffman encoding process in which a zero run value representing the number of successive 0s of coefficient data and a coefficient data value are applied to a Huffman table and thereby a variable length code (encoded data output) is generated. The DCT code from the variable length code encoding circuit 8 is supplied to a packing circuit 9 which divides the DCT code into data indicating the length, in bytes, of the data area of the sync block.

A framing circuit 11 receives the DC component DC from the DCT circuit 4, the variable length code from the packing circuit 9, the quantizing number QNO from the estimator 7 and an auxiliary code AUX from an auxiliary code generating circuit 10, and from which the framing circuit 11 outputs data for constructing the data area of a sync block. The output of the framing circuit 11 is supplied to a parity generating circuit 12 which encodes the received data with an error correction code, such as, a product code.

The horizontal and vertical data of the error correction code are encoded with Reed Solomon code. The horizontal error correction code is referred to as an inner code. On the other hand, the vertical error correction code is referred to as an outer code. The inner code is used for data contained in the data area of a single sync block and thereby a horizontal parity PT is generated. There may be a sync block which only contains a vertical parity. In a variable speed reproducing mode, data extracted as sync blocks are treated to be valid and error-corrected with the inner code.

Figure 2:
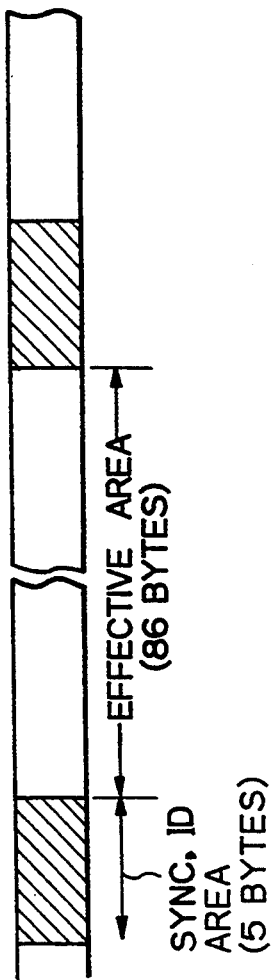
FIG. 2 is a schematic diagram showing the composition of a synchronous and ID area.

The output of the parity generating circuit 12 is supplied to a memory 13 with which a memory controller 14 is connected. As shown in FIG. 2, the memory 13 outputs data which consists of an effective area (for example, containing 86 bytes) and a synchronous and ID area (containing 5 bytes and being shown hatched in the figure). Thus, in the example shown, each sync block output by the memory 13 contains 91 bytes.

The output of the memory 13 is supplied to an ID adding circuit 15. An ID generating circuit 16 receives memory control information (for example, information indicating the type of record, the sync block number, and so forth) from the memory controller 14 and inserts an ID signal in the above-mentioned synchronous and ID area. The output signal of the ID adding circuit 15 is supplied to an adding circuit 17 in which a block synchronous signal from a synchronous generating circuit 18 is inserted in the synchronous and ID area. The sync block composition record data from the adding circuit 17 is applied to an output terminal 19. The record data from output terminal 19 is supplied to two rotating heads through channel encoding circuits and record amplifiers (not shown) and then recorded on a magnetic tape.

Two tracks are simultaneously formed on the magnetic tape by the two rotating heads which are adjacently disposed. For example, data of one frame is divided into ten portions or segments and recorded on ten corresponding tracks on the magnetic tape. A PCM audio signal is encoded with error correction code and recorded on the magnetic tape along with the video data. Alternatively, the PCM audio data is recorded on an audio data record region disposed on one track of the magnetic tape, that is, apart from the tracks on which the video data are recorded. The composition of a sync block of the PCM audio signal is the same as that of the above-mentioned video data. In addition, a subcode for controlling the detection of a program start point or the like has the same composition as the video data. The subcode is recorded on a predetermined area of a track of the magnetic tape.

Figure 3:
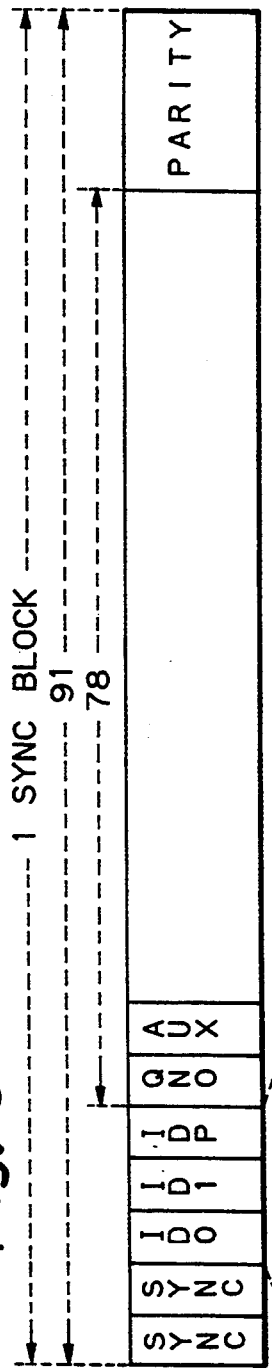
FIGS. 3 and 3A are schematic diagrams showing the format of a sync block of transfer data.

FIG. 3 shows the composition of one sync block (of 91 bytes) generated by the apparatus of FIG. 1. The sync block is composed of a sequence of bytes which consist of a block synchronous signal SYNC (of two bytes), ID signals of two bytes (ID0 and ID1), and a parity IDP for an ID signal. The next 78 bytes constitute a data area and the last 8 bytes are the parity of inner product code. At the head of the data area, there are disposed a one-byte-quantizing number QNO for identifying a quantizing step and then an auxiliary code AUX. The auxiliary code AUX is followed by 76 bytes of data. The positions of the quantizing number QNO and the auxiliary code AUX can be changed to anywhere within the data area, for example, as shown in FIG. 5.

As shown in FIG. 3, the ID signal ID0 consists of a frame identification bit FRID, a format identification bit OTHERS, record data type bits RTYPE1 and RTYPE0, and four high order bits SYNC8 to SYNC11 of the sync block number. The ID signal ID1 consists of the remaining eight bits SYNC0-SYNC7 of the sync block number. The IDP consists of two parities, of four bits each indicated at PARITY 00–PARITY 03 and at PARITY 10–PARITY 13. As further shown in FIG. 3, the ID signals ID0 and ID1 are divided into four nibbles of four bits each. For the four nibbles, two parities (for example, parities of Reed Solomon code) are generated.

Figure 3A:
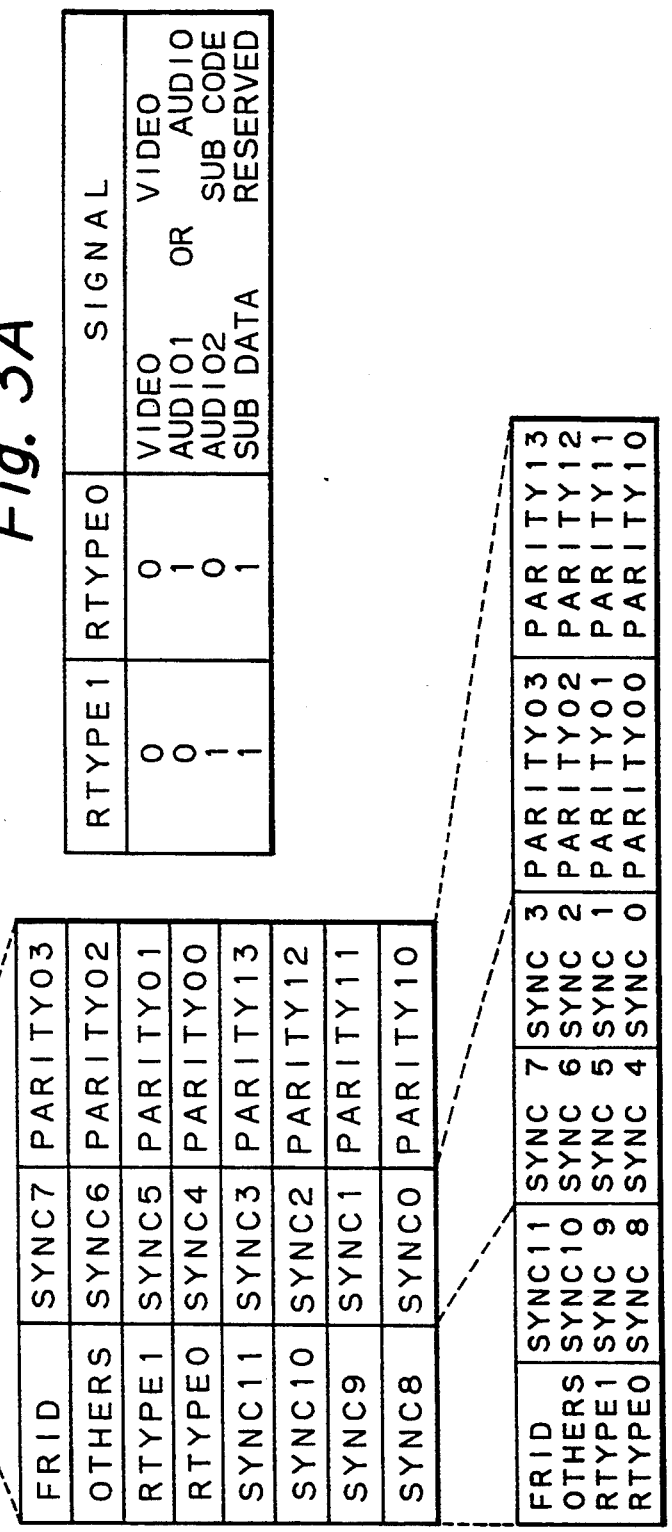

The frame ID is inverted frame by frame. The identification bit OTHERS is used to identify the digital VTR format of the embodiment and the other format, such as, a digital streamer's format. For example, the identification bit OTHERS with the value of "1" may represent the digital VTR format, while the identification bit OTHERS with the value of "0" represents the other format. As shown in FIG. 3A, the RTYPE1 and RTYPE0 bits represent the types of record data in a respective sync block, such as, video, audio 1, audio 2, and subdata. In addition, the sync block number of 12 bits indicates the addresses sequentially given to all sync blocks divided and recorded on a plurality of tracks. As opposed to the foregoing, both a track address and the sync block number of a track can be used. However, when the number of tracks increases, not using the track address can decrease the number of bits more than the case where both the track address and the sync block number are used.

The auxiliary code AUX in the data area is a kind of an ID signal. The auxiliary code AUX contains information for identifying the broadcast system type of the video signal, the audio mode, and so forth. What the auxiliary code AUX represents depends on the type of record data designated by the bits RTYPE1 and RTYPE0. Thus, it is not necessary to record all ID signals for all types of record data. The quantizing number QNO and the auxiliary code AUX are recorded in the data area because the error correction code for data in the data area has a higher correction capability than that for the ID signal. In addition, the auxiliary code AUX and the quantifying number QNO are IDs particular to the digital VTR. In the case where this format is used in other systems, such as, a data streamer, it is not necessary to record the quantifying number QNO and auxiliary code AUX and, therefore, the respective bits may be used as a recording area. In such case, it is possible to record a signal of 684 kbps in the data area.

FIG. 5 shows another record format which is suitable for use in digital VTRs. The table of FIG. 5A shows record data types depending on the value of the auxiliary code AUX.

When AUX is "0", the field identification bit 60/50 represents 60 fields. When AUX is "1", the field identification bit 60/50 represents 50 fields.

In addition the indicated values of the bits STYPE2 to STYPE0 represent the following signal formats:

The value (SD-H 4:3) indicates a basic format for a digital VTR (for example, for compressing an image with a 4:3 aspect ratio into an image with a data rate of approx. 25 micro bps).

The value (SD-L) indicates a format in which an image with a data rate of SD-H 4:3 is compressed into an image with half the original data rate.

The value (SD-H 16:9) indicates a basic format for a digital VTR which compresses an image with a 16:9 aspect ratio into an image with a data rate of approx. 25 micro bps.

The value (HD 1125/60) indicates a format which may be used for compressing a high definition TV signal with 1125 lines and a field frequency of 60 Hz into a signal with a data rate of approx. 50 micro bps.

The value (HD 1250/60) indicates a format which is used for compressing a high definition TV signal with 1250 lines and a field frequency of 50 Hz into a signal with a data rate of approx. 50 micro bps.

Figure 4:
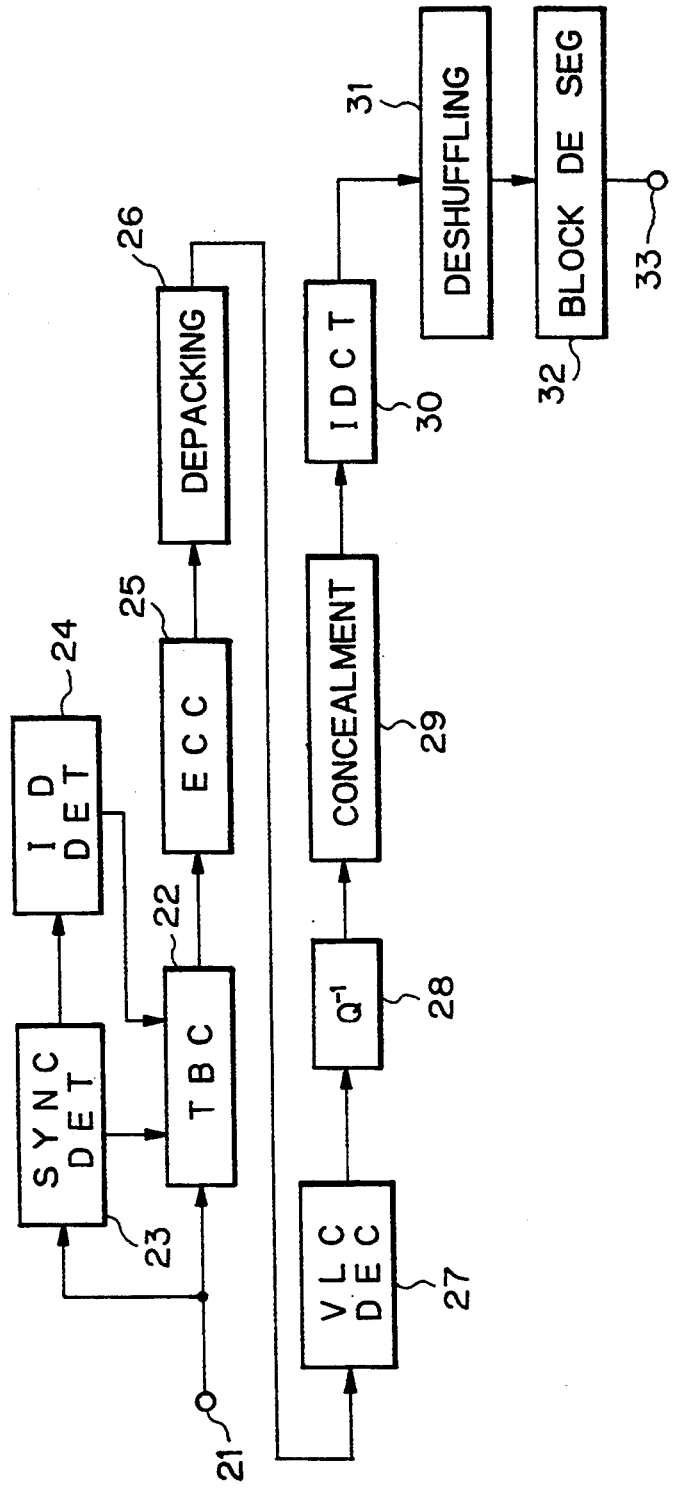
FIG. 4 is a block diagram showing a reproduced data processing circuit of the digital VTR in accordance with an embodiment of the present invention.

Referring now to FIG. 4, it will be seen that, in a reproduction processing circuit of a digital VTR in accordance with an embodiment of the present invention, data reproduced from a magnetic tape by rotating heads (not shown) are sent to an input terminal 21 through reproducing amplifiers, channel coding encoding circuits, and so forth (not shown). Such reproduced data is supplied from terminal 21 to a time base corrector (TBC) 22 and a synchronous detecting circuit 23 detects a synchronous signal of a sync block in the reproduced data and is connected to an ID detecting circuit 24 which detects an ID signal.

The TBC 22 contains a memory (not shown) and a write address of such memory is formed on the basis of a write clock in synchronization with the reproduced data, sync block number, and a record data ID. The reproduced data is mapped in a predetermined area of the TBC memory. Data being read from the memory of the TBC 22 with a clock at a predetermined frequency are supplied to an error correcting circuit 25 which corrects errors of the data.

Since error correction encoding are performed both for an ID signal and for data, as described above, respective errors in the ID signal and in the data can be detected and corrected. The error correcting circuit 25 outputs, in addition to an ID signal and data which have been corrected, an error flag which indicates whether or not an error took place. The output of the error correcting circuit 25 is supplied to a depacking circuit 26 which transforms a code signal of byte sequence into a variable length code supplied to a variable length code decoder 27 capable of decoding, for example, two-dimensional Huffman code.

The variable length code decoder 27 is connected to an inversely quantizing circuit 28. As distinguished from a quantizing circuit, the inversely quantizing circuit 28 multiplies a code signal by a quantizing step so as to form a respective value. The inversely quantizing circuit 28 is connected to an error concealment circuit 29 which uses correct data for concealing a previously uncorrected data error. The error concealment circuit 29 is connected to an inverse DCT transforming circuit 20. The inverse DCT transforming circuit 30 restores coefficient data to pixel data, the restored pixel data from the inverse DCT transforming circuit 30 is supplied to a deshuffling circuit 31 which performs a process that is the inverse of that performed by the shuffling circuit 3. The output of the deshuffling circuit 31 is supplied to a block desegmentation circuit 32 which transforms data in the block sequence into data of the raster scanning sequence. The error concealment circuit 29 and the inverse DCT transforming circuit 30 may be interchanged in position from that shown on FIG. 4.

The PCM audio signal and the subcode reproduced from the magnetic tape are error-corrected by a circuit following the TBC 22. When the format identification bit represents the other format, that is, the format other than the digital VTR format, the ID signal detecting circuit 24 issues to the user a warning message which represents that the relevant data cannot be reproduced. In addition, the ID signal detecting circuit 24 detects the type of the record data from the record data identification bit and adequately performs the process for such data.

According to the present invention, by using an ID signal contained in data being reproduced, the format of the data can be identified. Thus, in addition to digital VTRs, the ID signal can be easily employed for identifying other apparatuses such as, a data streamer. Moreover, since a record data identification bit is inserted into the ID signal, it is not necessary to record an ID for each record data. The ID signal thereby avoids narrowing of the effective data area.

Having described a specific preferred embodiment of the present invention with reference to the accompanying drawings, it is to be understood that the invention is not limited to that precise embodiment, and that various changes and modifications may be effected therein by one skilled in the art without departing from the scope of the spirit of the invention as defined in the appended claims.

What is claimed is:

1. A digital information signal transferring apparatus for transferring sequential sync blocks, each sync block being of a data structure having an effective area which contains digital information signals which may be of different types, and a synchronous and ID area which contains synchronous, ID and parity information signals, said apparatus comprising:
    encoding means for encoding an input digital information signal and providing corresponding output data;
    insertion area forming means for forming, in said output data of said encoding means, an insertion area for said synchronous signal and said ID signal;
    means for supplying said ID signal which includes format identifying data to identify a type of device that will be supplied with said sync block, data for identifying the type of said digital information signal, and a sync block number; and
    ID adding means for adding said ID signal in said insertion area.

2. The digital information signal transferring apparatus as in claim 1, further comprising:
    quantizing means for quantizing said output data of said encoding means;
    estimating means for determining a quantizing step of said quantizing means and generating quantizing step data;
    auxiliary code generating means for generating an auxiliary code in accordance with said information signals; and
    means for selectively adding said auxiliary code and said quantizing step data to said effective area;
    whereby the amount of effective area of the sync block may be selectively increased when said auxiliary code and said quantizing step data are omitted.

3. The digital information signal transferring apparatus as in claim 2, further comprising:
    variable length code encoding means for encoding an output of said quantizing means with a variable length code;
    said quantizing step data of said quantizing means being limited for varying an output of said variable length code encoding means to at most a predetermined data amount in a predetermined time period; and
    framing means for forming said data structure of said sync block with the quantizing step data, the auxiliary code, a DC component of said digital information signal, and the output of the variable length code encoding means.

4. The digital information signal transferring apparatus as in claim 3, further comprising:
    packing means for dividing said output of the variable length code encoding means into sync blocks each having a data area of a predetermined number of bytes.

5. The digital information signal transferring apparatus as in claim 3, further comprising:
    error correction code encoding means for encoding said data area and said ID signal of each said sync block with an error correction code so as to provide a correction capability for said data area.

6. The digital information signal transferring apparatus as in claim 4, wherein, in a recording mode of a digital magnetic recording apparatus, said ID adding means is adapted to add a code representing a record format of said digital magnetic recording apparatus to the format identification signal of said ID signal, and said framing means is operative to add said record format representing code to said auxiliary code.

7. A digital information signal recording apparatus for recording sequential sync blocks, each sync block being of a data structure having an effective area which contains digital information signals which may be of different types, and a synchronous and ID area which contains synchronous, ID and parity information signals, said apparatus comprising:
    encoding means for encoding an input digital information signal and providing corresponding encoded output data;
    insertion area forming means for forming, in said encoded output data of said encoding means, an insertion area for said synchronous signal and said ID signal;
    means for supplying said ID signal which includes format identifying data to identify a type of device that will be supplied with said sync block, data for identifying the type of said digital information signal, and a sync block number;
    ID adding means for adding said ID signal in said insertion area; and
    means for recording said encoded output data to which said ID signal has been added.

8. The digital information signal recording apparatus as in claim 7, further comprising:
    quantizing means for quantizing said encoded output data of said encoding means;
    estimating means for determining a quantizing step of said quantizing means and generating quantizing step data;
    auxiliary code generating means for generating an auxiliary code in accordance with said information signals; and
    means for selectively adding said auxiliary code and said quantizing step data to said effective area;
    whereby the amount of effective area of the sync block may be selectively increased when said auxiliary code and said quantizing step data are omitted.

9. The digital information signal recording apparatus as in claim 8, further comprising:

variable length code encoding means for encoding an output of said quantizing means with a variable length code;

said quantizing step data of said quantizing means being limited for varying an output of said variable length code encoding means to at most a predetermined data amount in a predetermined time period; and framing means for forming said data structure of said sync block with the quantizing step data, the auxiliary code, a DC component of said digital information signal, and the output of the variable length code encoding means.

10. The digital information signal recording apparatus as in claim 9, further comprising:

packing means for dividing said output of the variable length code encoding means into sync blocks each having a data area of a predetermined number of bytes.

11. The digital information signal recording apparatus as in claim 9, further comprising:

error correction code encoding means for encoding said data area and said ID signal of each said sync block with an error correction code so as to provide a correction capability for said data area.

12. A digital information signal transferring method for transferring sequential sync blocks, each sync block being of a data structure having an effective area which contains digital information signals which may be of different types, and a synchronous and ID area which contains synchronous, ID and parity information signals, comprising the steps of:

encoding said digital information signal;

forming an insertion area for said synchronous signal and said ID signal in the encoded digital information signal;

supplying said ID signal which includes format identifying data to identify a type of device that will be supplied with said sync block, data for identifying the type of said digital information signal, and a sync block number; and adding said ID signal in said insertion area.

13. The digital information signal transferring method as in claim 12, further comprising the steps of:

quantizing the encoded digital information signal;

determining a quantizing step of said quantizing and generating corresponding quantizing step data;

generating an auxiliary code in accordance with said information signals; and selectively adding said auxiliary code and said quantizing step data to said effective area;

whereby the amount of effective area of the sync block may be selectively increased when said auxiliary code and said quantizing step data are omitted.

14. The digital information signal transferring method as in claim 13, further comprising the steps of:

encoding the quantizied information signal with a variable length code;

said determine of said quantizing step data of said quantizing means limits an output of said variable length code encoding means to at most a predetermined data amount in a predetermined time period; and forming said data structure of said sync block with the quantizing step data, the auxiliary code, a DC component of said digital information signal, and the output of the variable length code encoding.

15. The digital information signal transferring method as in claim 14, further comprising the step of:

dividing said output of the variable length code encoding into sync blocks each having a data area of a predetermined number of bytes.

16. The digital information signal transferring method as in claim 14, further comprising the step of:

encoding said data area and said ID signal of each sync block with error correction code for providing a correction capability for said data area.

17. In a digital information signal receiving apparatus for receiving sequential sync blocks, each sync block being of a data structure having an effective area which contains digital information signals which may be of different types, and a synchronous and ID area which contains synchronous, ID and parity information signals, with the synchronous and ID information signals being inserted in data areas containing data representing the digital information signal, a signal processing circuit comprising:

ID error correcting means for correcting an error of an ID signal which includes format identifying data to identify a type of device that will be supplied with said sync block, data for identifying the type of said digital information signal, and a sync block number;

data error correcting means for correcting an error of digital information representing data in a data area; and inversely transforming means for inversely transforming error corrected data into an original digital information signal, said signal processing circuit being controlled with said sync block number of said error corrected ID signal and a record data ID.

* * * * *